United States Patent [19]

Corrigan et al.

[11] Patent Number: 5,015,265

[45] Date of Patent: May 14, 1991

[54] PROCESS FOR MAKING CUBIC BORON NITRIDE FROM COATED HEXAGONAL BORON NITRIDE, AND ABRASIVE PARTICLES AND ARTICLES MADE THEREFROM

[75] Inventors: Francis R. Corrigan, Westerville; David E. Slutz, Worthington, both of Ohio

[73] Assignee: General Electric Company, Worthington, Ohio

[21] Appl. No.: 365,883

[22] Filed: Jun. 14, 1989

[51] Int. Cl.$^5$ .............................................. B24D 3/00
[52] U.S. Cl. ....................................... 51/293; 51/295; 51/309
[58] Field of Search ........................... 51/293, 295, 309

[56] References Cited

U.S. PATENT DOCUMENTS

| | | | |
|---|---|---|---|
| 3,852,078 | 12/1974 | Wakatsuki et al. | 501/92 |
| 3,853,582 | 10/1974 | Labossier et al. | 427/190 |
| 4,011,064 | 3/1977 | Lee et al. | 51/295 |
| 4,062,660 | 12/1977 | Nicholas et al. | 51/295 |
| 4,063,907 | 12/1977 | Lee et al. | 51/295 |
| 4,148,863 | 4/1979 | Farafontov et al. | 423/290 |
| 4,188,194 | 2/1980 | Corrigan | 51/307 |
| 4,289,503 | 9/1981 | Corrigan | 51/307 |
| 4,353,714 | 10/1982 | Lee et al. | 51/298 |
| 4,399,167 | 8/1983 | Pipkin | 427/217 |
| 4,401,443 | 8/1983 | Lee et al. | 51/307 |
| 4,776,861 | 10/1988 | Frushour | 51/293 |

OTHER PUBLICATIONS

Kirk-Othmer, Encyclopedia of Chemical Technology, vol. 15, Third Edition, (1981), pp. 241-274, Metallic Coatings, (Survey).

Primary Examiner—William R. Dixon, Jr.
Assistant Examiner—Willie Thompson
Attorney, Agent, or Firm—Gary L. Loser

[57] ABSTRACT

Abrasive particles and articles made from cubic boron nitride derived from coated hexagonal boron nitride which is substantially free of oxides and volatile contaminants. Polycrystalline CBN is prepared from HBN by removing oxide from the surface of HBN particles to form HBN particles having a substantially oxide-free surface. The HBN particles having a substantially oxide-free surface are coated with an agent which is capable of preventing re-oxidation of the surface of the HBN particles to form coated HBN particles in a substantially oxide-free state. The coated HBN particles in a substantially oxide-free state are then converted to a polycrystalline CBN by direct conversion of HBN to CBN. Coating agents include metals, metal carbides, metal nitrides and metal borides. A preferred coating agent is titanium carbide.

56 Claims, 1 Drawing Sheet

PROCESS FOR MAKING CUBIC BORON NITRIDE FROM COATED HEXAGONAL BORON NITRIDE, AND ABRASIVE PARTICLES AND ARTICLES MADE THEREFROM

BACKGROUND OF THE INVENTION

This invention relates to polycrystalline cubic boron nitride, and more particularly, to a direct conversion process for making cubic boron nitride from coated, substantially oxide-free hexagonal boron nitride, and abrasive particles and articles made therefrom.

In the preparation and use of polycrystalline cubic boron nitride (CBN) prepared by the conversion of hexagonal boron nitride (HBN) to CBN, it has been found that the presence of oxide contaminants in the starting HBN interferes with the quality of the converted polycrystalline CBN and the sintering of the resulting converted polycrystalline CBN mass. In many of the current methods which have been adapted to remove the oxide contamination in the starting HBN, the surface of the HBN re-oxidizes before and during the process for the conversion of the HBN to CBN.

Another problem relating to the preparation and use, in for example, grinding wheels and cutting tools, of polycrystalline CBN prepared by conversion of HBN to CBN, is the control of the breakdown characteristics of the resultant directly-converted polycrystalline CBN particles during metal removal applications. A major factor in determining the performance of abrasive grinding wheels and cutting tools made from directly-converted polycrystalline HBN particles, is how the abrasive particles break down during the grinding application.

Cubic boron nitride (CBN), soft graphite (hexagonal) boron nitride (HBN) and other forms of boron nitride are described by Corrigan in U.S. Pat. No. 4,188,194 which is incorporated herein by reference in its entirety. In U.S. Pat. No. 4,188,194 hexagonal boron nitride (HBN) substantially free of catalytically active materials is maintained at pressures in excess of 60Kbar and temperatures of about 1800° C. and higher for a period of time sufficient to directly convert the HBN to polycrystalline CBN. Corrigan ('194) discusses the detrimental effects of oxide contamination, for example, $B_2O_3$, MgO and $Al_2O_3$, and suggests as examples, the use of tantalum, titanium, vanadium and other Group IV metals; zirconium, molybdenum and other Group V metals; and hafnium, tungsten and other Group VI metals, as metals which do not interfere with the conversion/sintering process, yet prevent impurity penetration into the sample when used as shielding material.

In U.S. Pat. No. 4,289,503, incorporated herein by reference in its entirety, Corrigan makes cubic boron nitride from hexagonal boron nitride powder by removing boric oxide from the surface of the HBN and converting the HBN to CBN, in the absence of impurities which interfere with the conversion to CBN, by high pressure-high temperature treatment at 55–80 kilobars and from 1600° C. to the reconversion temperature for a time sufficient to convert the HBN to CBN and sinter the CBN. The preferred HBN in Corrigan ('503) is pyrolytic boron nitride (PBN), and Corrigan utilizes vacuum heating or firing of the HBN powder to remove volatile impurities, particularly boron nitride surface contamination. Corrigan ('503) also discusses the mixing of graphite with HBN powder to prevent particle fusion. Corrigan, in U.S. Pat. No. 4,289,503, provides a coating of boron on the surfaces of the oxide-free HBN before conversion to CBN.

In one prior art method, CBN particles are coated with a metal, the metal being capable of forming a chemical bond with the particles, including the steps of providing a mass of metal for the coating in powdered form in contact with the particles, heat treating the metal powder and the particles at a temperature below the melting point of the metal to deposit a layer of metal on the particles and recovering the particles as discrete, metal coated particles, the heat treatment taking place in a non-oxidizing atmosphere and being chosen to allow chemical bond formation between the particles and the coating as described in U.S. Pat. No. 4,399,167. In the description of prior art set forth in U.S. Pat. No. 4,399,167, it is indicated that the metal coating of particles of CBN may be achieved by a variety of methods depending on the nature of the metal coating, the coating being applied electrolytically, electrolessly or by vacuum deposition, it being indicated that in the case of carbide formers, the most practical method of coating the particles of CBN being that of vacuum deposition. The preferred metals of U.S. Pat. No. 4,399,167 for coating CBN particles are titanium, manganese, chromium, vanadium, tungsten, molybdenum and niobium.

It can be seen from the foregoing, that it would be advantageous to form polycrystalline CBN from HBN by techniques which more completely remove the oxide contaminants, that is, which form a substantially oxide-free surface, and which prevent the formation of oxide contaminants, that is, prevent re-oxidation of the surface, during the direct conversion of HBN to CBN. More specifically, it would be advantageous to use HBN particles as a starting material wherein not only has the oxide been substantially removed from the surface of the HBN but also wherein the surface has been protected from re-oxidation before and/or during the direct conversion process to polycrystalline CBN. Furthermore, it would be advantageous to utilize a process to maintain the oxide-free HBN particles in an oxide-free state prior to and during the direct conversion to polycrystalline CBN by using a process and materials which do not interfere with the direct conversion process itself.

In order to improve the properties and other characteristics of polycrystalline CBN particles resulting from the direct conversion of HBN particles, it would be advantageous to control particle breakdown characteristics and to improve the control of the particles size while improving chemical bonding or interparticle bonding.

SUMMARY OF THE INVENTION

Accordingly, it is an object of this invention to provide an improved process for making CBN from oxide-free HBN, and improved abrasive particles and articles made therefrom.

Another object of the present invention is to provide a process for maintaining the HBN in an oxide-free state prior to and/or during the direct conversion of the HBN particles to the polycrystalline CBN.

It is another object of the present invention to provide a process for the direct conversion of HBN particles to polycrystalline CBN while preventing re-oxidation of oxide-free HBN particles.

Another object of the present invention is to provide polycrystalline CBN by direct conversion of HBN particles in an oxide free state wherein the polycrystalline CBN has improved interparticle bonding or is capable of improved interparticle bonding.

Still another object of the present invention is to provide polycrystalline CBN particles and masses having controlled breakdown characteristics.

Another object of the present invention is to provide abrasive particles having improved interparticle bonding and controlled breakdown characteristics and articles made therefrom.

It is still another object of the present invention to provide a process for removing oxide from the surface of HBN and protecting the surface thereof from re-oxidation and to provide a coated HBN having a surface substantially oxide-free.

It is another object of the present invention to provide a HBN suitable for conversion to polycrystalline cubic boron nitride.

These and other objects are achieved by a coating process wherein HBN particles are coated with an agent capable of preventing re-oxidation of the surface of the HBN particles prior to and during the direct conversion of the HBN particles in the oxide-free state to polycrystalline CBN. An inert, protective coating which does not interfere with the direct conversion process of the HBN to polycrystalline CBN and which is capable of preventing re-oxidation of the HBN particles, is applied on the surface of the particulate HBN while the surface of the HBN is in a substantially oxide-free state.

In accordance with at least some of the objects of the present invention, there is provided a process for making polycrystalline CBN comprising, applying an inert, protective coating on the surface of particulate HBN in a substantially oxide-free state; and converting the coated, substantially oxide-free particulate HBN to polycrystalline CBN.

In accordance with the present invention, there is also provided a method for improving the breakdown characteristics of directly-converted CBN comprising, applying an inert, protective, sinterable, interparticle bonding agent on the surface of particulate HBN in a substantially oxide-free state; and converting the coated, substantially oxide-free particulate HBN having the inert, protective, sinterable, interparticle bonding agent thereon to polycrystalline CBN containing the sinterable interparticle bonding agent Further, the polycrystalline CBN containing the sinterable interparticle bonding agent is formed into an article, and the article is heated at a temperature sufficient to sinter the sinterable, interparticle bonding agent.

The present invention also embraces substantially oxide-free HBN particles having coated thereon an inert agent capable of preventing re-oxidation of the surface of the HBN, the inert agent being capable of acting as an interparticle bonding agent in polycrystalline CBN formed therefrom without interfering with the conversion of HBN particles to polycrystalline CBN. There is also provided, in accordance with the present invention, an abrasive composition having improved breakdown characteristics comprising CBN having reduced oxide contamination and an interparticle bonding agent capable of preventing oxidation of the surface of HBN from which the CBN is formed.

The process of the present invention results in polycrystalline CBN particles or polycrystalline CBN masses wherein the polycrystalline CBN particles or masses are of high purity because the HBN particles are maintained in a substantially oxide-free state prior to and during the conversion of HBN particles to polycrystalline CBN. The coating process of the present invention prevents re-oxidation of the HBN particles prior to and/or during the direct conversion of the HBN particles to CBN without interfering with the direct conversion process. Furthermore, coating of the HBN particles in accordance with the process of the present invention prior to conversion and/or sintering into polycrystalline CBN masses allows control of the resulting particle breakdown characteristics by means of control of the coated HBN particle size; by means of the particular coating material applied to the HBN; and by means of the thickness of the coating material on the HBN, the coating thickness determining the interparticle bonding strength between the ultimate CBN particles. As used herein, CBN means polycrystalline cubic boron nitride.

In accordance with the present invention, HBN particles are first treated to remove boron oxide and other volatile materials from the HBN particles, especially from the surfaces, and while the HBN particles are in a substantially oxide-free state, a coating, which will prevent re-oxidation of the HBN particles, and which will not interfere with the subsequent direct high pressure, high temperature conversion of the HBN particles to CBN, is applied to the HBN particles. The coated particles are then loaded in a high pressure, high temperature cell and subjected to pressure and temperature conditions sufficient to induce direct conversion of the HBN particles to polycrystalline CBN yielding a mass composed of polycrystalline CBN sintered together through the coating material applied to the HBN particles. The recovered polycrystalline CBN mass may be milled to any desired particle size for various grinding applications, or the polycrystalline CBN mass may be ground to desired shapes for cutting tool applications.

In an alternative embodiment, the coated HBN particles are mixed with a non-sinterable powder, such as graphite, prior to loading in the high pressure, high temperature conversion cell.

In accordance with the present invention, it is also possible to apply a non-sinterable coating on the HBN particles having an oxide-free surface prior to converting the coated HBN in an oxide-free state to CBN. Thus, the agent capable of preventing re-oxidation of the surface of the HBN particles to form coated HBN particles in an oxide-free state, is non-sinterable, for example, a carbon-based coating such as graphite. Alternatively, the HBN particles in an oxide-free state can be first coated with any of the sinterable coatings discussed herein and thereafter coated with a non-sinterable coating as discussed above prior to the direct conversion of the HBN to CBN. In these cases, after the direct conversion is induced, individually coated particles of polycrystalline CBN are obtained, the size of the coated polycrystalline CBN particles being directly related to the size of the starting particles of HBN. The coating material can be removed by any suitable means if non-coated polycrystalline CBN particles are desired.

These and other objects will be apparent from the following description of the various embodiments when considered with the accompanying drawings.

DETAILED DESCRIPTION OF THE INVENTION

Figure 1:
FIG. 1 is a photomicrograph showing polycrystalline cubic boron nitride particles of 200/230 mesh size with the inert, protective, sinterable, interparticle bonding agent coated thereon in accordance with the present invention.

Any hexagonal boron nitride (HBN) which may be converted to polycrystalline cubic boron nitride (CBN) by the direct conversion process well-known in the art, may be used in the process and may be coated in accordance with the process of the present invention. The crystalline forms of boron nitride are well known in the art and are described, for example, in U.S. Pat. No. 4,188,194 and U.S. Pat. No. 4,289,503. Pyrolytic boron nitride (PBN) is a particularly useful form of HBN for carrying out the process of the present invention. PBN is a form of boron nitride prepared by chemical vapor deposition with highly imperfect, but high temperature stable structure referred to generally as turbostatic boron nitride structure. The higher lattice energy state, due to the turbostatic structure of PBN, reduces the height of the energy barrier for direct conversion to polycrystalline CBN (compared to the energy barrier height for direct conversion of the ideal HBN structure). This allows direct conversion to proceed at pressures obtainable with commercially useful high pressure apparatus without the need of catalyst or conversion aids. PBN is also available in large pieces which can be milled to powder form, so that any desired particle sizes can be obtained for coating and subsequent conversion in accordance with the process of the present invention. An alternative approach for obtaining HBN particles of the desired size is to press isostatically vacuum fired HBN power or micron size and containing excess boron which acts as a conversion aid. The large consolidated chunks obtained by this approach are then milled to the size desired for coating. The particular form and size of the HBN which may be used in the process of the present invention, is not critical, and the process of the present invention is easily adaptable to any form and size of HBN particle. Generally, particle sizes for HBN are determined by the desired particle size for the CBN. For example, if an average particle size of 50 microns is desired for the coated CBN particles, then the average particle size of the HBN should be about 75 microns, less the thickness of the coating. In those embodiments where comminution, milling or other pulverization techniques are used to reduce the particle size of the CBN or to break up the mass resulting from the conversion of the coated HBN to CBN, then it is preferable to use HBN having larger particle sizes than the particle size desired for the CBN particles. Generally, particle sizes of about 10 to about 1000 microns are used for most applications.

Although any pre-treatment process may be used in accordance with the present invention to obtain the HBN in a substantially oxide-free state, otherwise referred to herein as HBN particles having a substantially oxide-free surface, preferably, the pre-treatment process comprises vacuum heating or firing of the HBN powder to remove volatile impurities, particularly surface oxide contaminants such as boron oxide. Although it is not practical to remove all of the oxide and/or other volatile impurities from the HBN, by the conventional techniques discussed below and by several other prior art techniques, a sufficient amount of the oxide or oxides and/or other volatile components are removed to provide HBN which is substantially oxide-free and substantially free of other volatile contaminants, that is, having low oxide and/or other volatile contaminants content, suitable for conversion to polycrystalline CBN. As used herein, the phrase "substantially oxide-free" refers to HBN having a reduced amount of oxide and/or other volatile contaminants so that polycrystalline CBN of high purity can be prepared by the direct conversion process. In accordance with the present invention the amount of oxide and/or other volatile contaminants is not critical as long as there is a reduced amount of oxide and/or other volatile contaminants so that the oxide and/or other volatile contaminants do not interfere with the conversion of HBN to CBN. Generally, in preferred embodiments of the present invention, up to about 90%, and more preferably, about 90 to 98% by weight of oxides and other volatile contaminants are removed from HBN in the pretreatment step to form a substantially oxide-free HBN.

When vacuum firing of HBN powder is carried out in the HBN thermal decomposition temperature range, in addition to degassing of the surface oxide contaminant, a thin coating of free boron is generated (from decomposition) on the surfaces of the substantially oxide-free powder particles. The amount of free surface boron developed and the vacuum and temperature conditions needed for thermal decomposition and for removing the volatile impurities, including oxide contaminants, are described in detail in U.S. Pat. No. 4,289,503, incorporated herein by reference in its entirety.

Although it has been felt that the vacuum firing pacifies the HBN powder to re-oxidation on re-exposure to the atmosphere, it has been determined that the coating process of the present invention results in the improvements of the present invention by providing additional safeguard against re-oxidation of the surface of the HBN particles. However, in accordance with the present invention, when vacuum firing of HBN powder is used to remove oxide from the surface of the HBN, it is not necessary to fire the HBN at the thermal decomposition temperature. It is only necessary to carry out vacuum firing at the thermal decomposition temperature when it is desirable to have free boron on the surface of the HBN.

In accordance with the present invention, HBN suitable for conversion to polycrystalline CBN can be prepared by removing the oxide from the surface of HBN particles to form HBN particles having a substantially oxide-free surface; and by coating the HBN particles having an oxide-free surface with an agent capable of preventing re-oxidation of the surface of the HBN particles to form coated HBN particles in a substantially oxide-free state. The composition prepared by this process is HBN having a substantially oxide-free surface and having coated thereon an agent capable of preventing oxidation of the surface of the HBN. In preferred embodiments, the agent capable of preventing oxidation of the surface of the HBN is an interparticle bonding material, for example, a sinterable material, that is, it is capable of providing a bond between the particles of CBN after the HBN is converted to CBN and/or subsequent to sintering. It has been determined in accordance with the present invention that the coated HBN particles remain oxide-free once the coating has been applied, and the coated HBN particles can be converted to polycrystalline CBN immediately or after a period of time, for example after one year or longer.

Although the HBN powder can be placed in a vacuum furnace and heated under vacuum for a time sufficient to vaporize surface oxide contaminant to form HBN particles having a substantially oxide-free surface, and thereafter the HBN particles having a substantially oxide-free surface can be placed in a separate device or apparatus for coating an agent capable of preventing re-oxidation of the surface of the HBN particles to form coated HBN particles in a substantially oxide-free state, it is preferred that the pre-treatment to vaporize and remove surface oxide contaminant from the HBN particles and the coating of the HBN particles having a substantially oxide-free surface with the agent capable of preventing re-oxidation of the surface of the HBN particles, be carried out in the same non-reactive container. For example, when the agent capable of preventing re-oxidation of the surface of the HBN particles is applied by chemical vapor deposition (CVD), it is preferred that the pre-treatment which removes oxide and/or other volatile contaminants from the surface of the HBN particles, be carried out in the low pressure chemical vapor deposition chamber. HBN particles having oxide and other contaminants on the surface may be heated in the low pressure CVD chamber for a time sufficient to vaporize surface oxide contaminants and other volatile materials in accordance with the conditions specified, for example, in U.S. Pat. No. 4,289,503. Thereafter, without removal of the HBN particles having a substantially oxide-free surface from the low pressure CVD chamber, the coating process can be carried out without exposing the HBN in a substantially oxide-free state to an oxidizing atmosphere or other contaminants which would impact or effect the direct conversion of the HBN in the substantially oxide-free state to polycrystalline CBN. After the high temperature vacuum removal of the oxide and other volatile contaminants, the CVD coating process can be continued in the CVD chamber.

The particular process and system used to remove surface oxide or oxide and other volatile contaminants from the HBN particles and/or for coating the inert, protective coating, that is, the agent capable of preventing re-oxidation of the surface of the HBN particles, is not critical in the practice of the present invention. One of the preferred methods of the present invention is the low pressure chemical vapor deposition process and system discussed above. However, any process and system which will remove surface oxides and other volatile contaminants from the surface of the HBN particles and/or which will provide the inert, protective coating or agent capable of preventing re-oxidation of the surface of the HBN particles, may be used in the present invention. These alternative methods include sputtering processes and systems, any other vacuum deposition process or system, electrolytic processes and systems and/or electroless processes and systems which are well known in the art. Naturally, one skilled in the art will be able to determine the particular process and system which will most efficiently apply the inert, protective coating on the surface of particulate HBN in a substantially oxide-free state.

The agent capable of preventing re-oxidation of the surface of the HBN particles to form coated HBN particles in a substantially oxide-free state, otherwise defined herein as an inert, protective coating on the surface of particulate HBN in a substantially oxide-free state or as an inert, protective, sinterable, interparticle bonding agent on the surface of particulate HBN in a substantially oxide-free state, may be any agent which does not interfere with the direct conversion of HBN particles to polycrystalline CBN while preventing re-oxidation of the surface of HBN particles, the surface of which was substantially free of oxide and other volatile contamination prior to the application of the agent or coating on the HBN particles. The agents or coating materials may be any suitable metals which do not form oxides or other reaction products or contaminants which would interfere with the conversion of the HBN to polycrystalline CBN and/or which would subsequently act as an interparticle bonding agent to promote the bonding of the polycrystalline CBN. Thus, the particular metal must be inert, that is, it must not form oxides or other reaction products which would interfere with the direct conversion of the HBN to CBN and/or to the subsequent interparticle bonding of the polycrystalline CBN or to any subsequent use of the CBN, for example, as abrasive particles for grinding. In certain embodiments, the inert metal coating agent must be sinterable to promote the formation of a CBN mass and to promote the interparticle bonding of the polycrystalline CBN. Furthermore, the metal coating agent must be protective, that is, it must prevent the re-oxidation of the HBN powder or particulate matter so that it can be maintained in an oxide-free state prior to and/or during conversion of the HBN to CBN. Preferred metals include titanium, zirconium, hafnium, vanadium, niobium, tantalum, chromium, molybdenum, tungsten and the like or mixtures thereof.

The borides, nitrides and carbides of various metals, as well as of silicon, are generally preferred as the inert, protective coatings on the surface of particulate HBN in an oxide-free state. Examples of this preferred class of inert protective agents, which are also sinterable, interparticle bonding agents, include the borides, nitrides and carbides of titanium, zirconium, hafnium, vanadium, niobium, tantalum, tungsten, silicon, aluminum and the like. The preferred agents of the present process are titanium carbide and titanium nitride. As soon as the agent capable of preventing re-oxidation of the surface of the HBN particle is coated on the surface of the HBN particle having an oxide-free surface, a coated HBN particle in an oxide-free state is formed.

The thickness and/or amount of coating agent capable of preventing re-oxidation of the surface of the HBN particles to form coated HBN particles in an oxide-free state, is not critical. It is preferred that the entire surface of the HBN particle from which the oxide and other volatile contaminants have been removed, is covered or coated with the agent capable of preventing re-oxidation of the surface. Thus, any thickness of coating may be used in accordance with the process of the invention to provide the inert protective agent or inert, protective sinterable, interparticle bonding agent on the surface of the HBN particles. Sub-micron to micron thicknesses provide adequate protection of the HBN particles from which the oxide and other volatile contaminants have been removed. However, as indicated above, in order to control the resulting particle breakdown characteristics of the polycrystalline CBN, it may be desirable to increase the thickness of the coating. In most instances, the greater the thickness of the coating deposited on the surface of the oxide-free HBN particles, the greater the thickness and/or amount of interparticle bonding agent in the polycrystalline CBN mass or on the surface of the polycrystalline CBN particles, and further, in most instances, the greater the thickness of the interparticle bonding agent on the polycrystalline CBN or in the polycrystalline CBN mass, the less the interparticle bonding strength between the polycrystalline CBN particles. The maximum thickness of the interparticle bonding agent deposited on the surface of the oxide-free HBN particles is that thickness or amount of interparticle bonding agent wherein there is a substantial dilution effect on the resulting polycrystalline CBN mass or particles wherein the polycrystalline CBN particles are no longer considered the effective abrasive particle or material in the end use of the abrasive cutting tool, cutting wheel and the like. Generally, the most desirable thickness of the inert protective agent coated on the surface of HBN particles is about 1.0 micron or less, and more preferably, from about 0.5 micron to about 1.0 micron. Without undue experimentation, one skilled in the art can easily determine the amount of inert protective agent required to coat the surface of the HBN particles from which oxide and other volatile contaminants have been removed, depending on the end use of the converted particles, the amount required to provide a coating on the HBN particles of sufficient thickness to resist penetration by oxygen or other gases which would re-oxidize the oxide-free HBN particles, and/or the desired breakdown characteristics of the resultant polycrystalline CBN particles or mass resulting from the conversion from the coated, oxide-free HBN particles. As indicated above, the amount of inert, protective, sinterable, interparticle bonding agent coated on the surface of the HBN particles in the oxide-free state controls the breakdown characteristics of the resultant polycrystalline CBN particles or mass, and accordingly, one skilled in the art can easily determine the amount of agent required for optimization of performance in various end uses, such as, for example, grinding and other abrasive applications.

The conditions required for coating the HBN particles having a substantially oxide-free surface with an agent capable of preventing re-oxidation of the surface of the HBN particles to form coated HBN particles in a substantially oxide-free state, vary with the particular method used for applying the agent and with the particular agent applied to the surface of the HBN particles. Thus, the coating process is dependent upon the particular agent, namely, whether the agent is a metal, a metal boride, a metal carbide or a metal nitride, and/or upon the particular method used to deposit the metal, metal carbide, metal boride or metal nitride, for example, by sputtering, by electrolytic deposition, electroless deposition, vacuum deposition or the like. The particular conditions for coating are not critical, and any technique known in the art for applying a metal, a metal carbide, a metal boride or a metal nitride to the surface of a particle may be used in the coating process of the present invention.

One method of coating substantially oxide-free HBN particles with a metal coating is similar to the method of metal coating CBN particles as described in U.S. Pat. No. 4,399,167, incorporated herein by reference in its entirety for its teachings of applying metal coatings to particles. When the oxide and other volatile contaminants have been removed from the HBN, a mass of metal in powdered form for coating is placed in contact with the HBN particles in a substantially oxide-free state; the metal powder and the particles are then heat treated at a temperature below the melting point of the metal to deposit a layer of the metal on the particles, and the particles are recovered as discrete, metal coated particles, the heat treatment taking place in a non-oxidizing atmosphere. The heat treatment takes place at a temperature below the melting point of the metal, and accordingly, there is minimal sintering of the metal during the deposit of the metal on the surface of the oxide-free HBN particles.

The heat treatment generally involves raising the temperature of the powdered metal and the HBN particles in an oxide-free state to a temperature which varies according to the metal being coated, and then maintaining the elevated temperature for a period of time sufficient to allow the metal to deposit on the particles and bond thereto. As a general rule, the heat treatment is less than 60 minutes, and the coating thickness generally does not exceed a few microns, that is, less than 5 microns and preferably from about 0.5 to about 1 micron. The use of the non-oxidizing atmosphere is necessary to prevent the re-oxidation of the HBN particles during the coating process, and for example, the non-oxidizing atmosphere may be provided by an inert gas, such as argon or neon or by a vacuum of $10^{-4}$ Torr or better. The metal powder, for example, those discussed above and including titanium, zirconium, niobium and the like or mixtures thereof, may have a particle size in the range of about 125 to 37 microns and more typically, in the range of about 88 to about 74 microns, however, the particle size of the metal powder is not critical in the process of the present invention, as long as the metal can be coated on the HBN particle to form a protective coating. Other details of the coating of the particles of HBN in a substantially oxide-free state can be determined from the teachings of U.S. Pat. No. 4,399,167.

Sputtering of metals may also be used to provide the surface of substantially oxide-free HBN particles with an inert protective agent or an inert, protective, sinterable, interparticle bonding agent when the agent is a metal, by various well-known techniques including those discussed and described at page 267, Volume 15 of Kirk-Othmer, Encyclopedia of Chemical Technology (1981).

In one preferred embodiment, the HBN particles having an oxide-free surface are coated with an agent capable of preventing re-oxidation of the surface of the HBN particles by chemical vapor deposition (CVD), and more preferably by low pressure chemical vapor deposition (LPCVD). CVD and LPCVD methods and systems for depositing metals, metal carbides, metal borides and metal nitrides on surfaces are well-known in the art. In certain preferred embodiments, the carbide, boride or nitride of titanium, zirconium, tungsten, tantalum, niobium, hafnium, chromium, vanadium or molybdenum, or mixtures thereof are agents which may be applied to HBN particles by CVD or LPCVD techniques. In preferred embodiments, the agent capable of preventing re-oxidation of the surface of HBN particles is titanium carbide derived from titanium tetrachloride and methane gas by chemical vapor deposition at a reduced pressure and an elevated temperature (LPCVD). In other preferred embodiments, the agent capable of preventing reoxidation of the surface of HBN particles is titanium nitride derived from nitrogen gas and titanium tetrachloride maintained at a sufficient temperature and pressure during the CVD on the surface of the HBN particles, and titanium nitride derived from boron nitride on the surface of the HBN and titanium tetrachloride vapor maintained at a sufficient temperature and pressure to form titanium nitride on the surface of the HBN. The boron nitride in the foregoing embodiment is derived from the boron nitride in the HBN.

In one of the preferred processes of the present invention, the oxide and/or other volatile components are removed from the surface of HBN particles by heating the particles in a vacuum at a sufficient temperature and pressure to vaporize the oxide and other volatile contaminants, and thereafter the agent capable of preventing re-oxidation of the surface of the HBN particles is deposited on the surface of the HBN particles by the low pressure chemical vapor deposition of the agent, the removal of the oxide and other volatile contaminants and the low pressure CVD of the agent being carried out in the same chamber or device. Typical CVD and LPCVD processes, systems and devices are well-known in the art and are described by Kirk-Othmer, Encyclopedia of Chemical Technology, Vol. 15 at pages 262 to 264 (1981).

Other processes for applying the inert protective agent or inert, protective, sinterable, interparticle bonding agent capable of preventing re-oxidation of the particulate HBN, are well-known in the art and include various electrolytic and electroless techniques and systems. Such techniques and systems may be used to deposit the coatings in accordance with the present invention as long as the particular process and system do not introduce oxides or other contaminants or any other materials or process parameters which interfere with the direct conversion of HBN to polycrystalline CBN. Kirk-Othmer, Encyclopedia of Chemical Technology, Vol 15, pp. 241-274 (1981) describes many alternative techniques which may be used to apply the protective coatings of the present invention.

After the coated HBN particles in a substantially oxide-free state are formed, they can be stored for subsequent conversion, or they can be immediately converted to a polycrystalline CBN mass or particles by direct conversion of HBN to CBN by processes well-known in the art. When the conversion is effected, generally a polycrystalline CBN sintered mass is formed by the direct conversion process. The polycrystalline CBN mass can be milled to mesh size particles, for example, from about 10 microns or lower in size to about 1000 microns, and more preferably, from about 10 microns to about 200 microns, depending upon the end use of the particles. When the polycrystalline CBN mass is converted (milled) to particles of polycrystalline CBN, generally, the milled particles comprise polycrystalline CBN containing coating material. In this type of milling, the coating does not necessarily remain on all surfaces of the polycrystalline CBN, and certain areas of the polycrystalline CBN are no longer protected by the inert protective agent or inert, protective sinterable, interparticle bonding agent even though the agent remains in the polycrystalline CBN and in certain instances, partially covers particles of the milled polycrystalline CBN (see FIGS. 1 and 2). This milled polycrystalline CBN containing inert, protective, agent can be formed into an article of any desired shape, for example, a cutting tool or a grinding tool, and heated at a temperature sufficient to sinter the inert, protective, sinterable, interparticle bonding agent. In this manner, the directly-converted polycrystalline CBN has improved breakdown characteristics, and in accordance with the present invention, there is provided a method for improving the breakdown characteristics of directly-converted polycrystalline CBN by applying an inert, protective, sinterable, interparticle bonding agent on the surface of particulate HBN in a substantially oxide-free state; and converting the coated, substantially oxide-free particulate HBN having the protective, sinterable, interparticle bonding agent thereon to polycrystalline CBN containing the sinterable, interparticle bonding agent. Further, in accordance with the present invention, the polycrystalline CBN containing the inert, protective, sinterable, interparticle bonding agent is formed into an article and the article is heated at a temperature sufficient to sinter the sinterable, interparticle bonding agent, the temperature being dependent on the sintering temperature of the particular metal, metal carbide, metal boride or metal nitride used as the inert, protective, sinterable, interparticle bonding agent as well known in the art. The polycrystalline CBN particles containing sinterable, interparticle bonding agents are generally defined herein as abrasive particles. The abrasive composition having improved breakdown characteristics is polycrystalline cubic boron nitride (CBN) having reduced oxide contamination and an interparticle bonding agent capable of preventing oxidation of the surface of HBN from which the CBN is converted.

In a further embodiment of the present invention, the coated HBN particles in a substantially oxide-free state are mixed with a non-sinterable powder, such as graphite and other inert powders, prior to converting the coated HBN particles to polycrystalline CBN, to form a non-sinterable powder and coated HBN mixture. Thereafter, the non-sinterable powder and coated HBN mixture are subjected to conditions which convert the HBN to coated polycrystalline CBN particles by direct conversion of the HBN to CBN.

In another embodiment of the present invention, the coating applied to the surface of the HBN particles is a non-sinterable material, such as various forms of carbon including graphite. The non-sinterable coatings can be applied to the surface of the HBN particles by conventional methods. Any non-sinterable coating materials can be used on the HBN as long as they do not interfere with the direct conversion process, as long as they do not contaminate the final CBN product, and the like. In still another embodiment of the present invention, the HBN particles in an oxide-free state can be first coated with a sinterable coating material and thereafter coated with a non-sinterable coating material.

In accordance with the present invention, it is also possible to remove the coating from the surface of the coated polycrystalline CBN particles to form neat polycrystalline CBN particles. For example, nitric acid, sulfuric acid or a mixture thereof can be used to remove most coatings from polycrystalline CBN particles. In another embodiment of the process of the present invention, the non-sinterable powder, for example graphite, can be easily removed by techniques well-known in the art. For example nitric acid, sulfuric acid or a mixture thereof can be used to remove graphite from the mixture. In many instances the coating and non-sinterable powder can be removed simultaneously by the same agent or agents. By mixing the non-sinterable powder with the coated HBN particles prior to loading the HBN particles in the high pressure cell for conversion, the size of the particles of polycrystalline CBN converted therefrom is about two-thirds the size as the particles of coated HBN, and this technique permits accurate control over the resultant particle size of the CBN. Thus, for example by this technique, when the average particle size of the HBN is about 50 microns, the particle size of the CBN converted therefrom will also be 35 microns plus the increased size due to the coating thickness. If the coating is then removed from the CBN, the average particle size of the CBN will be 35 microns In other embodiments of the present invention, HBN particles coated with inert, protective, sinterable, interparticle bonding agents can be placed into an apparatus, such as a die, press or other device of a desired shape, for example, a grinding wheel, a cutting tool or any other element. The coated, substantially oxide-free particulate HBN is converted in the apparatus, for example a die, press or vessel of desired shape, to polycrystalline CBN. Thus, the polycrystalline CBN assumes the shape of the apparatus (die, press or vessel), and the finished composition is in the shape of the particular apparatus. When the agent coating the HBN is sinterable, then the HBN can be heated at a temperature sufficient to sinter the coating material, generally about 900° C. to about 1500° C. or higher, depending on the particular agent. In this manner, the sintered mass can be shaped into a particular cutting tool, grinding tool or other device at any stage of the process, for example, when the oxide and other contaminants are removed and the HBN is coated; when the coated HBN is converted to CBN or subsequent thereto. By "sintering" or "sinterable", as used herein, is meant the agglomeration or the ability to agglomerate of the metal or other protective coating on the HBN at temperatures below the melting point, which temperatures can be easily determined by one skilled in the art.

The direct conversion process for converting the coated HBN particles in a substantially oxide-free state to a polycrystalline CBN mass or particles by direct conversion of the HBN to CBN is well described in the art. For example, Corrigan in U.S. Pat. No. 4,188,194 and U.S. Pat. No. 4,289,503 which have been previously incorporated by reference herein, teach the necessary conditions including pressures and temperatures as well as the appropriate cells or devices in which the conversion can take place.

The coated HBN particles in a substantially oxide-free state are placed in a reaction zone assembly in a high pressure/high temperature apparatus as described in U.S. Pat. No. 4,289,503. First the pressure and then the temperature are increased and held at the desired conditions for a sufficient time for conversion and sintering to occur, or in the case of a mixture of coated HBN particles and a non-sinterable powder, such as graphite, for a sufficient time for conversion to occur without sintering. The sample is allowed to cool under pressure for a short period of time, and finally the pressure is decreased to atmospheric pressure, and the polycrystalline CBN is recovered along with the inert protective coating material. Generally, in preferred embodiments, pressures of about 55–70 kbar and temperatures from about 1800° C. to 2300° C. are used for the conversion step.

EXAMPLES

The following examples are presented to more fully and clearly illustrate the present invention. They are presented as illustrative of the invention and are not to be construed as limiting the invention thereto. In the examples all parts and percentages are on a weight basis unless otherwise specified. For all examples, pressing was carried out in a high pressure-high temperature apparatus.

EXAMPLE 1

A quantity (25 gm) of 30/100 mesh pyrolytic boron nitride (PBN) powder was inserted into a LPCVD apparatus. The system was evacuated to below 0.10 Torr, and then scrubbed by flowing dry hydrogen gas through the system. While under vacuum, the temperature of the PBN was raised to 1000° C. to remove $B_2O_3$ and any other volatile contaminants prior to LPCVD coating of the particles with titanium carbide. Coating with titanium carbide was accomplished by flowing a mixture of titanium tetrachloride, hydrogen, and methane gases through the system for approximately 2 hrs. at 1,000° C. and about 100 Torr. After cooling under vacuum, the sample was removed from the apparatus and found to have a grey/black appearance (PBN powder is white) indicating TiC coating of the particles had been obtained which was subsequently confirmed by x-ray diffraction analysis of the particles.

Samples of the TiC-coated particles were placed in high-pressure cells as described in U.S. Pat. No. 4,289,503, and high pressure experiments were run at pressure and temperature conditions sufficient for direct conversion of PBN to CBN. After pressing, the samples were recovered primarily in sintered disk shaped pieces. Fracture surfaces of the as-pressed pieces were found to be much rougher than corresponding fracture surfaces obtained on conversion of micron-sized CBN 550 vacuum-fired powder. The fracture surface of the converted coated disk samples contained ridges and steps which appear to be a reflection of the starting PBN size indicating the breakdown characteristics can be controlled by controlling the PBN starting powder size. A number of the disks were milled to mesh size particles. Microscopic observation revealed the particles to be composed of transparent polycrystalline CBN areas bonded to each other through a thin dark interface, (TiC or TiC/BN reaction products) the size and shape of the converted CBN areas corresponding to the size and shape of the starting PBN particles.

Additional conversion experiments were made on samples of the coated particles mixed with sufficient graphite in order to obtain individual particle conversion without particle-to-particle sintering. After recovery the samples were treated with hot nitric/sulfuric acid to remove the graphite yielding individual converted CBN particles of size and shape corresponding to the size and shape of the starting PBN particles. At this stage a gold hue was observed on the particles under bright light indicating the presence of TiN on the particle surfaces.

The TiN on the surface is most likely to have occurred as follows: Initially in the coating cycle, titanium tetrachloride and hydrogen are introduced first in an attempt to start a surface reaction with the PBN to form a monolayer of TiN, then the methane is introduced for a carbon source to build the TiC coating on to the particles. It is possible that after the acid leaching step only the TiC was removed leaving the TiN golden layer on the particle surfaces.

EXAMPLE 2

A quantity (50 gm) of 100/140 mesh-size PBN was TiC coated as described in Example 1. Successful coating was obtained as evidenced by the grey/black color of the PBN particles after coating. Samples of the coated PBN were high-pressure, high-temperature converted as in Example 1. As with the converted pieces in Example 1, fracture surfaces of the pieces were rough (compared to converted CBN 550 pdr.) again having many steps and ridges which, however, were on a smaller scale compared to those of Example 1 corresponding to the smaller size PBN particles used in Example 2 as compared to Example 1.

EXAMPLE 3

CBN particles obtained by milling, cleaning and sizing disc shaped converted masses obtained from TiC coated 100/140 mesh-size PBN prepared as described in Example 2 were examined by light transmission photomicrographs.

In FIG. 1, the light transmission photomicrograph shows 200/230 mesh-size CBN particles at 240X magnification obtained from the TiC coated PBN. Where the particles are thin enough to allow light transmission (center particle in FIG. 1), the striated internal structure of the particle is evident. In the photomicrograph of FIG. 1, the light transmitting layer type areas are converted CBN and the thin dark lines between are the non-transmitting TiC coatings. The larger dark areas are where the particles are too thick to allow light transmission. The layered internal structure of the particles are a direct reflection of the shape of the high aspect ratio (predominantly greater than a ratio of 10 to 1) coated PBN particles.

Figure 2:
FIG. 2 is a photomicrograph showing polycrystalline cubic boron nitride particles of 80/100 mesh with the inert, protective, sinterable, interparticle bonding agent coated thereon in accordance with the present invention.

In FIG. 2, the light transmission photomicrograph shows 80/100 mesh-size CBN particles at 120X magnification. The center particle in FIG. 2 also illustrates the striated structure resulting from direct conversion of TiC coated PBN particles and has the same characteristics described above for FIG. 1.

EXAMPLE 4

TiC coated PBN particles prepared as in Example 1 above were exposed to the atmosphere for a period of 20 months at ambient temperature. After 20 months, the TiC coated PBN was converted to CBN by the technique of Example 1 by the direct conversion process described by Corrigan in U.S. Pat. Nos. 4,188,194 and 4,289,503. The CBN prepared in this manner had the same characteristics as the CBN of Examples 1 and 2 above. Thus, the coated, substantially oxide-free and volatile contaminant-free PBN can be safely stored without re-oxidation and subsequently converted after storage to CBN after exposure to atmospheric conditions.

EXAMPLE 5

A number of uncoated samples of the same PBN powder were also converted at the same pressure conditions as Examples 1 and 2 above. The recovered converted samples had a milky appearance which occurs due to oxide interference with the direct conversion and sintering process, and the samples did not show the stepped/ridged type fracture surfaces obtained with the coated samples.

Direct conversion of PBN (turbostratic HBN) is influenced by oxide contamination. While oxide contamination has been found to promote conversion (lower pressure required) it is detrimental to sintering and is characterized by a white/cloudy/milky appearance of the converted product. With PBN, which can be obtained in large pieces and milled to obtain a range of particle sizes, the influence of oxide contamination can be seen as a function of the particle size converted. At sufficiently large particle size, unassisted direct conversion occurs, yielding clear (non-milky) product. As the PBN particle size is reduced, the converted product becomes milky white in appearance which is attributed to oxide induced conversion (detrimental) occurring with smaller particle-size material. The increased influence of oxide-induced conversion with decreasing particle size results from the increased oxide contamination covering the particle surfaces due to the large increase in surface area as the size is reduced.

Comparison of the results above, for the coated and uncoated particles, indicates that coating prevents undesirable oxide-induced conversion allowing the use of smaller particle sizes. Comparison of the fracture surface roughness (size of steps and ridges) indicates that the breakdown characteristics can be controlled by the starting coated-particle size. Since grinding performance is related to the breakdown characteristics of the abrasive particles, control of the starting coated-particle size provides a means for influencing grinding performance.

In addition to the above effects the use of coated particles influence the chemical wear and lubricating characteristics of the resultant converted particles or cutting tools fabricated from intact-converted disks.

While other modifications and variations of the present invention are possible in light of the above teachings, it is therefore to be understood that changes may be made in the particular embodiments of the invention described which are within the full intended scope of the invention as defined by the claims.

What is claimed is:

1. A process for the preparation of polycrystalline cubic boron nitride from hexagonal boron nitride comprising:
    (a) removing the oxide from the surface of the hexagonal boron nitride particles to form hexagonal boron nitride particles having a substantially oxide-free surface;
    (b) coating the hexagonal boron nitride particles having an oxide-free surface with an agent capable of preventing re-oxidation of the surface of the hexagonal boron nitride particles to form coated hexagonal boron nitride particles in an oxide-free state;
    (c) converting the coated hexagonal boron nitride particles in an oxide-free state to a polycrystalline cubic boron nitride mass by direct conversion of hexagonal boron nitride to cubic boron nitride.

2. The process of claim 1 further comprising converting the polycrystalline cubic boron nitride mass to particles of polycrystalline cubic boron nitride.

3. The process of claim 1 further comprising mixing the coated hexagonal boron nitride particles in an oxide-free state with a non-sinterable powder prior to converting the coated hexagonal boron nitride particles to polycrystalline cubic boron nitride, to form a non-sinterable powder and coated hexagonal boron nitride mixture; and thereafter converting the non-sinterable powder and coated hexagonal boron nitride mixture to coated polycrystalline cubic boron nitride particles by conversion of the hexagonal boron nitride to cubic boron nitride.

4. The process of claim 3 further comprising removing the non-sinterable powder.

5. The process of claim 4 further comprising removing the coating from the surface of the coated polycrystalline cubic boron nitride particles.

6. The process of claim 3 further comprising removing the coating from the surface of the coated polycrystalline cubic boron nitride particles.

7. The process of claim 1, wherein the hexagonal boron nitride particles having an oxide-free surface are coated with an agent capable of preventing re-oxidation of the surface of the hexagonal boron nitride particles by chemical vapor deposition.

8. The process of claim 7, wherein the agent is titanium carbide derived from titanium tetrachloride and methane gas in the chemical vapor deposition at a reduced pressure and an elevated temperature.

9. The process of claim 7, wherein the agent is titanium nitride derived from titanium tetrachloride and boron nitride in the surface of the hexagonal boron nitride at an elevated temperature.

10. The process of claim 7, wherein the agent is titanium nitride derived from titanium tetrachloride and nitrogen gas in the chemical vapor deposition at a reduced pressure and an elevated temperature.

11. The process of claim 1, wherein the agent capable of preventing re-oxidation of the surface of the hexagonal boron nitride particles is the boride, carbide or nitride of titanium, zirconium, tungsten, tantalum, niobium, hafnium, chromium, molybdenum, silicon, vanadium or mixtures thereof.

12. The process of claim 1, wherein the oxide is removed from the surface of the hexagonal boron nitride particles by heating the particles in a vacuum at a sufficient temperature and pressure to vaporize the oxide.

13. The process of claim 1, wherein oxide is removed from the surface of the hexagonal boron nitride particles by heating the particles in a vacuum at a sufficient temperature and pressure to vaporize oxide and thereafter the agent capable of preventing re-oxidation of the surface of the hexagonal boron nitride particles is deposited on the surface of the hexagonal boron nitride particles by the low-pressure chemical vapor deposition of the agent.

14. The process of claim 13, wherein the agent capable of preventing re-oxidation of the surface of the hexagonal boron nitride particles is selected from the group consisting of titanium carbide derived from methane gas and titanium tetrachloride maintained at a sufficient temperature and pressure during the chemical vapor deposition on the surface of the hexagonal boron nitride particles; titanium nitride derived from nitrogen gas and titanium tetrachloride maintained at a sufficient temperature and pressure during the chemical vapor deposition on the surface of the hexagonal boron nitride particles; and titanium nitride derived from boron nitride on the surface of the hexagonal boron nitride and titanium tetrachloride maintained at a sufficient temperature and pressure to form titanium nitride on the surface of the hexagonal boron nitride.

15. The process of claim 1, wherein the agent capable of preventing re-oxidation of the surface of the hexagonal boron nitride particles to form coated hexagonal boron nitride particles in a oxide-free state, is non-sinterable.

16. The process of claim 1, wherein the agent capable of preventing re-oxidation of the surface of the hexagonal boron nitride particles is sinterable and forms hexagonal boron nitride coated with a sinterable agent and further comprises coating a non-sinterable agent on the hexagonal boron nitride coated with the sinterable agent.

17. A process for making polycrystalline cubic boron nitride comprising:
(a) applying an inert, protective coating on the surface of particulate hexagonal boron nitride in a substantially oxide-free state; and
(b) converting the coated, substantially oxide-free particulate hexagonal boron nitride to polycrystalline cubic boron nitride.

18. The process of claim 17, wherein the coated, substantially oxide-free particulate hexagonal boron nitride is prepared by heating hexagonal boron nitride particulate having oxide thereon at a temperature and pressure sufficient to vaporize the oxide and thereafter coating the particles with an inert, protective agent capable of preventing re-oxidation of the particulate hexagonal boron nitride.

19. The process of claim 18, wherein the inert, protective agent coated on the particulate hexagonal boron nitride is titanium carbide or titanium nitride deposited thereon by chemical vapor deposition.

20. The process of claim 17, wherein the coated, substantially oxide-free particulate hexagonal boron nitride is subjected to sufficient pressure and temperature to induce direct conversion of the coated, substantially oxide-free hexagonal boron nitride to a polycrystalline cubic boron nitride mass.

21. The process of claim 20, wherein the polycrystalline cubic boron nitride mass is further subjected to milling to produce particles of polycrystalline cubic boron nitride containing coated polycrystalline cubic boron nitride.

22. The process of claim 17 further comprising mixing the coated, substantially oxide-free particulate hexagonal boron nitride with a non-sinterable powder to form a mixture of non-sinterable powder and coated, oxide-free particulate hexagonal boron nitride, and thereafter subjecting the mixture to sufficient pressure and temperature to induce direct conversion of the coated, substantially oxide-free particulate hexagonal boron nitride to coated particles of polycrystalline cubic boron nitride.

23. The process of claim 22, wherein the coated, substantially oxide-free particulate hexagonal boron nitride is prepared by heating hexagonal boron nitride particles having oxide thereon at a temperature and pressure sufficient to vaporize the oxide and thereafter coating the particles with an inert, protective agent capable of preventing re-oxidation of the particulate hexagonal boron nitride.

24. The process of claim 23, wherein the inert, protective agent coated on the particulate hexagonal boron nitride is titanium carbide or titanium nitride deposited thereon by chemical vapor deposition.

25. The process of claim 22 further comprising removing the non-sinterable powder.

26. The process of claim 25 further comprising removing the coating from the surface of the coated polycrystalline cubic boron nitride particles.

27. The process of claim 22 further comprising removing the coating from the surface of the coated polycrystalline cubic boron nitride particles.

28. A method for improving the breakdown characteristics of directly-converted cubic boron nitride comprising:
(a) applying an inert, protective, sinterable, interparticle bonding agent on the surface of particulate hexagonal boron nitride in a substantially oxide-free state; and (b) converting the coated, substantially oxide-free particulate hexagonal boron nitride having the inert, protective, sinterable, interparticle bonding agent thereon to polycrystalline cubic boron nitride containing the sinterable, interparticle bonding agent.

29. The method of claim 28, wherein the polycrystalline cubic boron nitride containing sinterable, interparticle bonding agent is abrasive particles.

30. The method of claim 28 further comprising:
(a) forming the polycrystalline cubic boron nitride containing the sinterable, interparticle bonding agent into an article; and
(b) heating the article at a temperature sufficient to sinter the sinterable, interparticle bonding agent.

31. The method of claim 30 wherein the article is a cutting tool.

32. The method of claim 30 wherein the article is a grinding tool.

33. The method of claim 28 further comprising pressing the coated, substantially oxide-free particulate hexagonal boron nitride having the inert, protective, sinterable interparticle bonding agent thereon in a form of desired shape and thereafter converting the coated, substantially oxide-free particulate hexagonal boron nitride to polycrystalline cubic boron nitride as in step (b), whereby a mass of the coated polycrystalline cubic boron nitride is in the shape of the form.

34. The method of claim 33 wherein the coating on the mass of polycrystalline cubic boron nitride is sintered to form a sintered mass containing the polycrystalline cubic boron nitride.

35. The method of claim 34 wherein the sintered mass containing polycrystalline cubic boron nitride is a cutting tool.

36. The method of claim 34 wherein the sintered mass containing polycrystalline cubic boron nitride is a grinding tool.

37. The method of claim 28, wherein the coated, substantially oxide-free particulate hexagonal boron nitride is prepared by heating hexagonal boron nitride particulate having oxide thereon at a temperature and pressure sufficient to vaporize the oxide and thereafter coating the particulate with an inert, protective, sinterable, interparticle bonding agent capable of preventing re-oxidation of the particulate hexagonal boron nitride.

38. The method of claim 37, wherein the inert, protective, sinterable, interparticle bonding agent coated on the particulate hexagonal boron nitride is titanium carbide or titanium nitride deposited thereon by chemical vapor deposition.

39. The method of claim 28, wherein the coated, substantially oxide-free particulate hexagonal boron nitride is subjected to sufficient pressure and temperature to induce direct conversion of the coated oxide-free hexagonal boron nitride to a polycrystalline cubic boron nitride mass.

40. The method of claim 39, wherein the polycrystalline cubic boron nitride mass is further subjected to milling to produce particles of polycrystalline cubic boron nitride containing coated polycrystalline cubic boron nitride.

41. The method of claim 28 further comprising mixing the coated, substantially oxide-free particulate hexagonal boron nitride with a non-sinterable powder to form a mixture of non-sinterable powder and coated, substantially oxide-free particulate hexagonal boron nitride, and thereafter subjecting the mixture to sufficient pressure and temperature to induce direct conversion of the coated, oxide-free particulate hexagonal boron nitride to coated particles of polycrystalline cubic boron nitride.

42. The method of claim 41, wherein the coated, substantially oxide-free particulate hexagonal boron nitride is prepared by heating hexagonal boron nitride particles having oxide thereon at a temperature and pressure sufficient to vaporize the oxide and thereafter coating the particles with an inert, protective, sinterable, interparticle bonding agent capable of preventing re-oxidation of the particulate boron nitride.

43. The method of claim 42, wherein the inert, protective, sinterable, interparticle bonding agent coated on the particulate hexagonal boron nitride is titanium carbide or titanium nitride deposited thereon by chemical vapor deposition.

44. The method of claim 41 further comprising removing the non-sinterable powder.

45. The method of claim 44 further comprising removing the coating from the surface of the coated polycrystalline cubic boron nitride particles.

46. The method of claim 41 further comprising removing the coating from the surface of the coated polycrystalline cubic boron nitride particles.

47. A process for the preparation of hexagonal boron nitride suitable for conversion to polycrystalline cubic boron nitride comprising:
(a) removing the oxide from the surface of hexagonal boron nitride particles to form hexagonal boron nitride particles having a substantially oxide-free surface; and
(b) coating the hexagonal boron nitride particles having an oxide-free surface with an agent capable of preventing re-oxidation of the surface of the hexagonal boron nitride particles to form coated hexagonal boron nitride particles in a substantially oxide-free state.

48. The process of claim 47 wherein the hexagonal boron nitride particles having a substantially oxide-free surface are coated with an agent capable of preventing re-oxidation of the surface of the hexagonal boron nitride particles by chemical vapor deposition.

49. The process of claim 48 wherein the agent is titanium carbide derived from titanium tetrachloride and methane gas in the chemical vapor deposition at a reduced pressure and an elevated temperature.

50. The process of claim 48 wherein the agent is titanium nitride derived from titanium tetrachloride and boron nitride in the surface of the hexagonal boron nitride at an elevated temperature.

51. The process of claim 48 wherein the agent is titanium nitride derived from titanium tetrachloride and nitrogen gas in the chemical vapor deposition at a reduced pressure and an elevated temperature.

52. The process of claim 48 wherein the agent capable of preventing re-oxidation of the surface of the hexagonal boron nitride particles is the boride, carbide or nitride of titanium, zirconium, tungsten, tantalum, niobium, hafnium, chromium, molybdenum, silicon, vanadium or mixtures thereof.

53. The process of claim 48 wherein the oxide is removed from the surface of the hexagonal boron nitride particles by heating the particles in a vacuum at a sufficient temperature and pressure to vaporize the oxide.

54. The process of claim 48 wherein the oxide is removed from the surface of the hexagonal boron nitride particles by heating the particles in a vacuum at a sufficient temperature and pressure to vaporize the oxide and thereafter the agent capable of preventing re-oxidation of the surface of the hexagonal boron nitride particles is deposited on the surface of the hexagonal boron nitride particles by the low-pressure chemical vapor deposition of the agent.

55. The process of claim 54 wherein the agent capable of preventing re-oxidation of the surface of the hexagonal boron nitride particles is selected from the group consisting of titanium carbide derived from methane gas and titanium tetrachloride maintained at a sufficient temperature and pressure during the chemical vapor deposition on the surface of the hexagonal boron nitride particles; titanium nitride derived from nitrogen gas and titanium tetrachloride maintained at a sufficient temperature and pressure during the chemical vapor deposition on the surface of the hexagonal boron nitride particles; and titanium nitride derived from boron nitride on the surface of the hexagonal boron nitride and titanium tetrachloride maintained at a sufficient temperature and pressure to form titanium nitride on the surface of the hexagonal boron nitride.

56. The process of claim 47 wherein the agent coated on the particulate hexagonal boron nitride is titanium carbide or titanium nitride deposited thereon by chemical vapor deposition.

* * * * *